United States Patent [19]
Chang

[11] Patent Number: 5,346,437
[45] Date of Patent: Sep. 13, 1994

[54] DUAL SOURCE DRIVE SYSTEM

[75] Inventor: Bobby Chang, Thousand Oaks, Calif.

[73] Assignee: R. R. Donnelley & Sons Company, Lisle, Ill.

[21] Appl. No.: 123,950

[22] Filed: Sep. 20, 1993

[51] Int. Cl.⁵ ............................................. F16H 7/08
[52] U.S. Cl. ................................................ 474/134
[58] Field of Search .................. 474/101, 109–111, 474/113–117, 133–138

[56] References Cited

U.S. PATENT DOCUMENTS

| | | |
|---|---|---|
| 1,805,326 | 5/1931 | Bunker et al. |
| 1,851,937 | 3/1932 | Perry, Jr. |
| 2,098,573 | 11/1937 | Dingle ........................... 474/134 X |
| 2,179,865 | 11/1939 | Skerratt ............................. 74/242.5 |
| 3,103,125 | 9/1963 | Dutro et al. ....................... 474/134 |
| 3,391,807 | 7/1968 | Buschbom ..................... 474/134 X |
| 4,498,889 | 2/1985 | Stevens et al. ..................... 474/133 |

Primary Examiner—Thuy M. Bui
Attorney, Agent, or Firm—Marshall, O'Toole, Gerstein, Murray & Borun

[57] ABSTRACT

A drive system for use in rotating a drive shaft of a component of a binding line can be selectively coupled to a primary motive power source associated with the binding line or to a secondary motive power source operated out of synchronization with binding line. The drive system includes a first drive pulley connected to the primary motive power source, a second drive pulley connected to the secondary motive power source and a double-sided drive belt which engages the drive shaft. A pulley set is coupled to the double-sided drive belt and is rotatable about a pivot point between first and second positions to transfer the double-sided drive belt between the first and second drive pulleys.

30 Claims, 5 Drawing Sheets

FIGURE 7

DUAL SOURCE DRIVE SYSTEM

FIELD OF THE INVENTION

The present invention relates generally to multiple power source drive systems, and more particularly to a dual power source, multiple speed drive system for use with a binding line, a mail table or the like.

BACKGROUND OF THE INVENTION

Large binding lines typically include a number of binding line components, including, for example, a gatherer, which gathers signatures to be collated into a printed book in a particular order, a stitcher, which staples or stitches the signatures together, and a trimmer, which trims the stitched signatures to a predetermined size to produce a finished book. Typically, binding lines also include a mail table which addresses the finished books, sorts the addressed books by, for example, zip code and/or carrier route, and bundles the sorted books together for shipping.

It is commonly known to power all of the individual binding line components using a single shaft driven by a single motive power source. Typically, the binding line components are permanently coupled to the shaft via separate drive systems which include a number of pulleys and belts or chains and which operate the associated binding line components at predetermined speeds dependent on the speed of the shaft. Such drive systems are considered inadequate, however, for a couple of reasons. First, the entire binding line must be operated in order to perform a job on a single binding line component, such as the mail table. Consequently, individual operation of a binding line component is expensive and time consuming. Second, only one person can perform a make-ready or a calibration procedure on a binding line having permanently configured drive systems because movement of a first binding line component causes movement of the shaft which, in turn, causes movement within the other the binding line components and, thereby, presents a safety hazard to anyone working on the other binding line components.

It is also known to provide reconfigurable drive systems within a binding line. Some of these reconfigurable drive systems, however, require an operator to adjust certain components thereof, such as drive chains, belts and/or pulleys, in order to decouple the drive system, and hence, the associated binding line component, from the shaft. These manually adjustable drive systems are considered inadequate because they require a high level of expertise on the part of the operator and because they require a large amount of time to be decoupled from the shaft.

Other drive systems which are capable of being decoupled from the shaft include clutch mechanisms. These drive systems are considered inadequate, however, because they are relatively complex and expensive, require a large amount of space, include many moving parts and, consequently, require a high level of maintenance. Furthermore, the clutch mechanisms of these drive systems typically include one or more sets of bearings, the failure of which may cause the clutch to inadvertently engage and couple the associated binding line component to the shaft. The resulting inadvertent and unexpected operation of certain binding line components, such as the trimmer, which includes sharp cutting elements, presents a serious safety hazard.

SUMMARY OF THE INVENTION

A multiple source drive system according to the present invention is capable of being decoupled from the shaft of a binding line or other power source and coupled to a secondary power source which operates the drive system at the same or a different speed as the shaft of the binding line. Such a drive system enables components of a binding line to be operated independently of one another as separate systems. Furthermore, such a drive system allows a make ready or calibration procedure to be performed simultaneously on multiple binding line components. Also, such a multiple source drive system is automatically reconfigurable in a minimal amount of time and with only a minimal amount of operator involvement. Still further, such a multiple source drive system is relatively compact, is inexpensive to build and operate, includes only a minimal amount of moving parts, and does not cause inadvertent operation of an associated binding line component upon failure.

More specifically, according to one aspect of the present invention, a drive system is connected to a motive power source and is capable of rotating a drive shaft at one of a plurality of speeds. The drive shaft includes a first drive pulley which is capable of rotating the drive shaft at a first speed, a second drive pulley which is capable of rotating the drive shaft at a second speed and a double-sided drive belt which is selectively engagable with either the first or the second drive pulley and which further engages the drive shaft to rotate the drive shaft in response to the rotation of either the first or the second drive pulley. Furthermore, means are coupled to the double-sided drive belt for transferring the double-sided drive belt from one to the other of the first and second drive pulleys.

Preferably, the transferring means includes a pulley set which has first and second idler pulleys and which is rotatable about a pivot point from a first position to a second position. The double-sided drive belt engages the first idler pulley when the pulley set is in the first position and engages the second idler pulley when the pulley set is in the second position. The first and second drive pulleys may include teeth thereon and may have different diameters so that the first drive pulley rotates the drive shaft at a different speed than the second drive pulley. Furthermore, the first drive pulley may be connected to the motive power source while the second drive pulley may be connected to a further motive power source.

The double-sided drive belt may include a first side which engages the first drive pulley when the pulley set is in the first position and a second side which engages the second drive pulley when the pulley set in the second position. The double-sided drive belt may also include teeth on the first and second sides thereof.

The drive system also preferably includes a take-up pulley which engages the double-sided drive belt to take up slack in the double-sided drive belt when the pulley set transfers the double-sided drive belt from one of the first and second drive pulleys to the other of the first and second drive pulleys. Furthermore, a controller may operate means for moving the pulley set and means for actuating the take-up pulley. The moving means may include a first air-driven cylinder which engages the pulley set to move the pulley set in a first direction and a second air-driven cylinder which engages the pulley set to move the pulley set in a second direction opposite the first direction. The actuating means may include a rotary vane air actuator.

According to another aspect of the present invention, a drive system which connects a drive shaft to either a first motive power source or a second motive power source includes a first drive pulley coupled to the first motive power source and a second drive pulley coupled to the second motive power source. A double-sided drive belt, which selectively engages either the first or the second drive pulley and which further engages the drive shaft, rotates the drive shaft in response to the rotation of the first or the second drive pulley. Means are coupled to the double-sided drive belt for transferring the double-sided drive belt from one of the first and second drive pulleys to the other of the first and second drive pulleys.

In accordance with yet another aspect of the present invention, a drive system drives a component of a binding line having a primary motive power source coupled to a line shaft and a secondary motive power source. The drive system includes a first drive pulley which is connected to the line shaft, a second drive pulley which is connected to the secondary motive power source and a double-sided drive belt which is selectively engagable with one of the first and second drive pulleys and which further engages the drive shaft so that the double-sided drive belt rotates the drive shaft in response to the rotation of the either the first or the second drive pulley. A pulley set is moveable in an arcuate path about a pivot point between a first position wherein a first pulley of the pulley set engages the double-sided drive belt and a second position wherein a second pulley of the pulley set engages the double-sided drive belt.

According to a still further aspect of the present invention, a method of providing motive power produced by first and second motive power sources to a drive shaft includes the step of providing a movable idler pulley set, a double-sided drive belt which is coupled to the idler pulley set and the drive shaft, and first and second drive pulleys which are coupled to the first and second motive power source, respectively. The method also includes the steps of selectively moving the idler pulley set to a first position wherein the double-sided drive belt engages the first drive pulley to couple the first motive power source to the drive shaft and selectively moving the idler pulley set to a second position wherein the double-sided drive belt engages the second drive pulley to couple the second motive power source to the drive shaft.

DETAILED DESCRIPTION OF THE PREFERRED EMBODIMENTS

Figure 1:
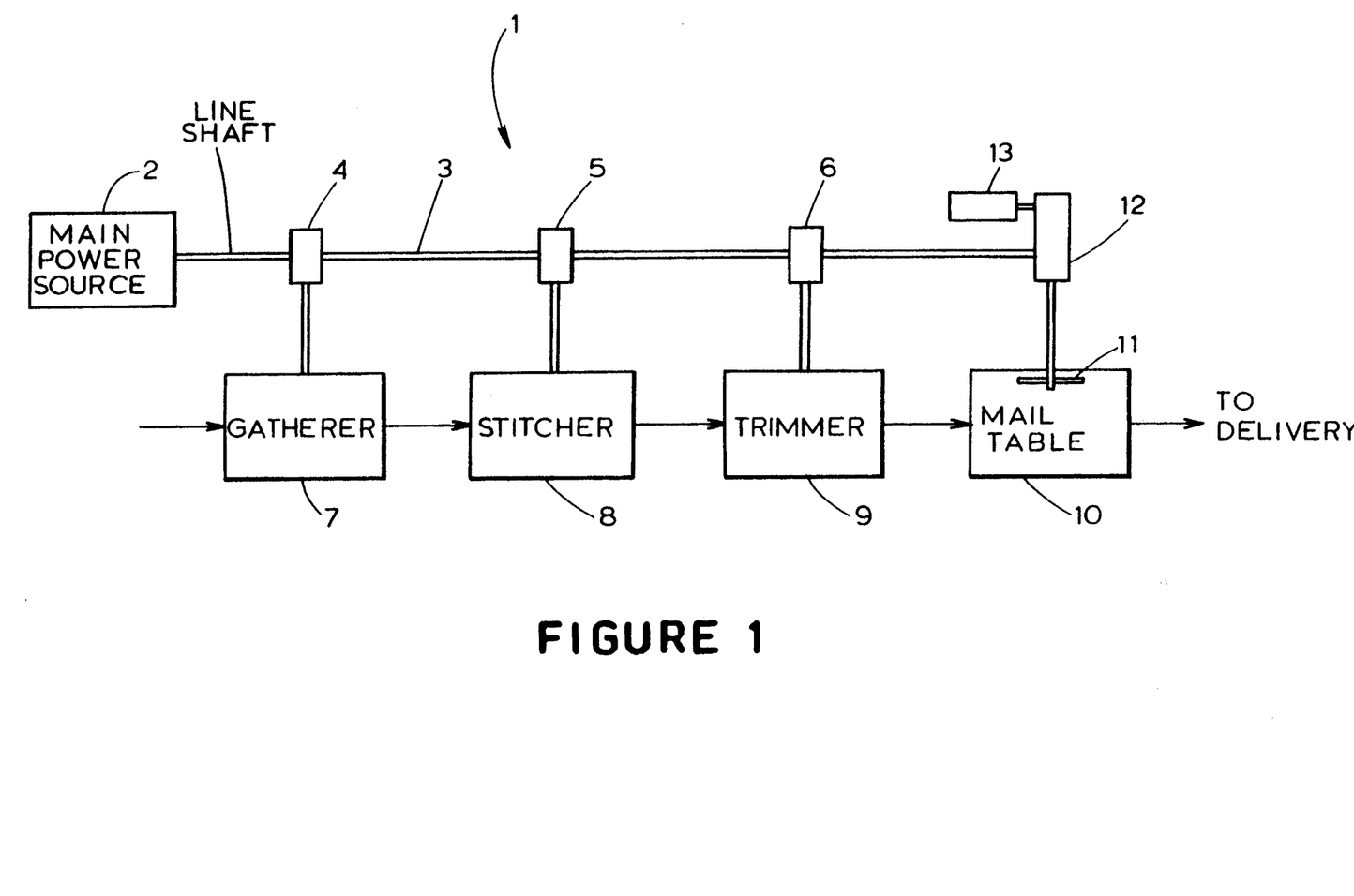
FIG. 1 is a generalized block diagram illustrating a binding line including a drive system according to the present invention.

Referring now to FIG. 1, a binding line 1, which binds printed signatures together to produce a book, includes a primary or main motive power source 2 which drives a line shaft 3. The line shaft 3 is coupled through gear boxes 4, 5 and 6 to a gatherer 7, a stitcher 8 and a trimmer 9, respectively.

The gatherer 7 assembles the printed signatures in a particular order and delivers the collated signatures to the stitcher 8 which stitches, staples or otherwise binds the signatures together. The bound signatures are then delivered to the trimmer 9 which trims the edges of the bound signatures to produce a completed bound book.

The binding system 1 also includes a mail table which receives bound books from the trimmer 9, sorts them by, for example, zip code and/or carrier route, and bundles the sorted books together for delivery. A drive shaft 11, the rotation of which is controlled by a drive system 12, operates the individual components of the mail table 10.

The drive system 12 is capable of being alternatively coupled to the line shaft 3 or to a secondary motive power source 13 which is operated independently of the line shaft 3 and the primary motive power source 2. When the drive system 12 interconnects the line shaft 3 and the mail table 10, the mail table 10 is synchronized with the gatherer 7, the stitcher 8 and the trimmer 9. When the drive system 12 is coupled to the secondary motive power source 13, the mail table 10 is decoupled from the binding line 1 and can be operated independently of the gatherer 7, the stitcher 8 and the trimmer 9 at a speed determined by the secondary motive power source 13.

Referring to FIGS. 2–7, the drive system 12 and the drive shaft 11 of the mail table 10 are illustrated in detail. The drive system 12 includes a metal support plate 14 which supports two free-spinning toothed idler pulleys 16 and 18, which have the same diameter, and a rotary actuator 20, which may be of the rotary vane type. A toothed take-up pulley 22 is attached to the back of the support plate 14 via a support bar 24 (shown in greater detail in FIG. 4). A second support plate 26 is attached to the front of the support plate 14 by support rods 28.

An idler pulley set 30 includes free-spinning toothed idler pulleys 32 and 34 attached to a support plate 36 and is rotatably mounted on the back of the support plate 26 about a pivot point 38. An idler pulley set drive mechanism 40, which is preferably a rotary air actuator, is attached to the front of the support plate 26 and includes two sets of pneumatic cylinders 42a, 42b, and 43a, 43b. Each set of cylinders 42a, 42b and 43a, 43b carries a gear rack 44 and 45 (shown in phantom), respectively, which engage a pinion gear 46 (shown in phantom) carried by the idler pulley set 30. The pinion gear 46 has a center axis coincident with the pivot point 38 of the pulley set 30. Operation of the cylinders 42a, 42b, 43a and 43b rotates the idler pulley set 30 about the pivot point 38 from a first position (shown in FIG. 3) to a second position (shown in FIG. 2).

Figure 2:
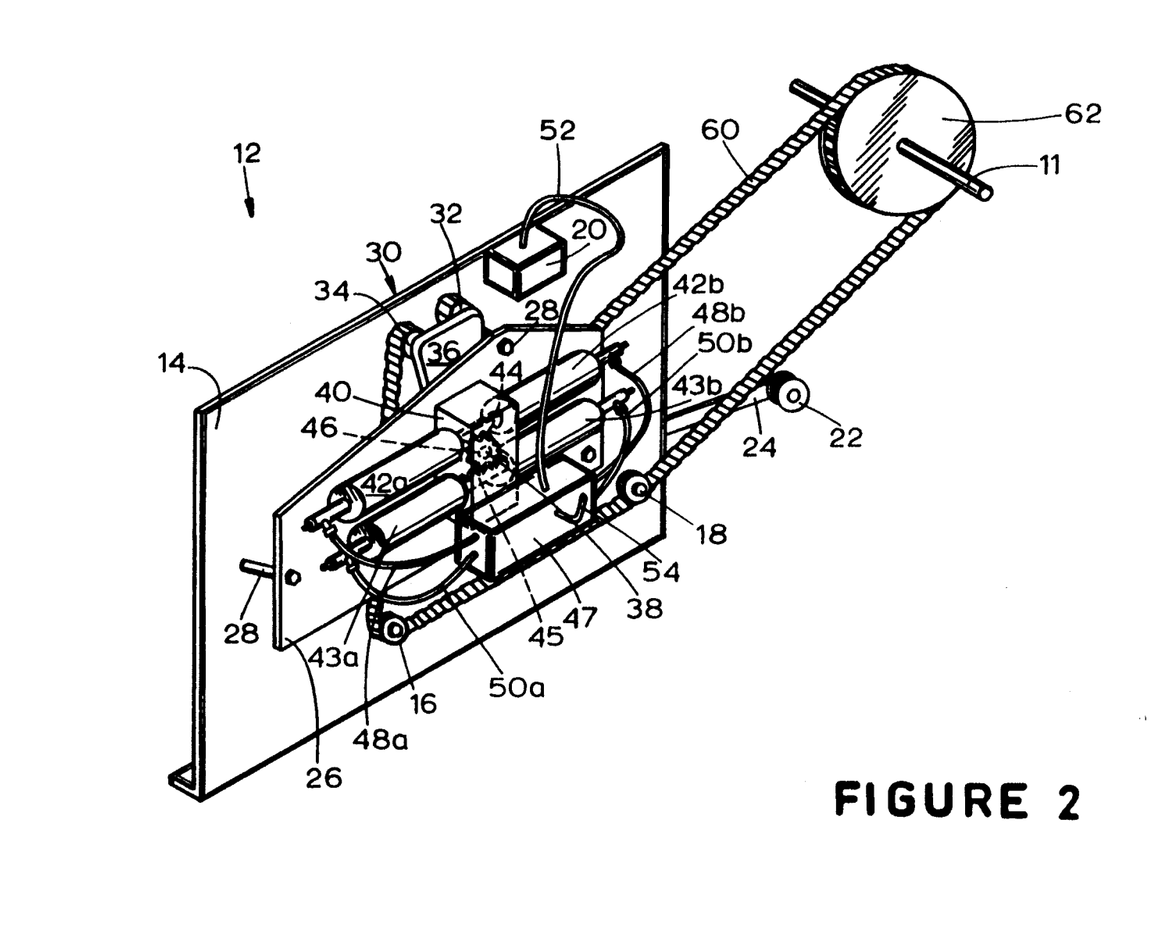
FIG. 2 is a front perspective view of the drive system according to the present invention in conjunction with a drive shaft.

A controller 47 is mounted on the drive mechanism 40 and is connected to the cylinders 42a, 42b, 43a and 43b and the rotary actuator 20 via air hoses 48a, 48b, 50a, 50b and 52, respectively. Furthermore, the controller 47 is connected to a source of pressurized air (not shown) via an input air hose 54. During operation, the controller 47 routes pressurized air from the input air hose 54 to the cylinders 42a, 42b, 43a and 43b via air hoses 48a, 48b, 50a and 50b, respectively, in order to rotate the idler pulley set 30 between the first and second positions. The controller 47 also routes pressurized air from the input air hose 54 to the rotary actuator 20 via the air hose 52 in order to actuate the take-up pulley 22, as described in detail hereinafter.

A toothed double-sided drive belt 60 engages the idler pulleys 16 and 18, one of the idler pulleys 32 or 34 of the idler pulley set 30 and a toothed drive shaft pulley 62 which is connected to the drive shaft 11 of the mail table 10. Furthermore, the double-sided drive belt 60 engages one of two drive pulleys 70 and 72, hidden from view in FIG. 2 but shown in more detail in FIGS. 3 and 5–7, in order to rotate the drive shaft 11.

Figure 3:
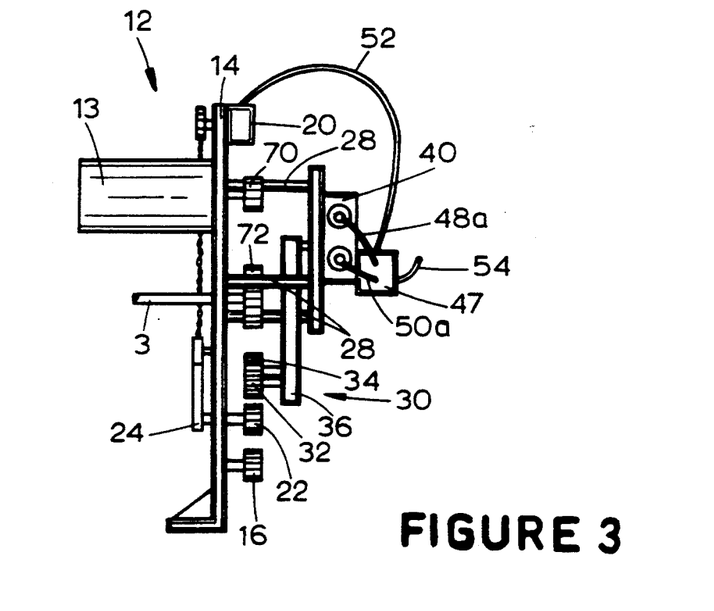
FIG. 3 is a side elevational view of the drive system of FIG. 2.

As illustrated in FIG. 3, in which the idler pulley set 30 is shown in the first position and the double-sided drive belt 60 is removed for the sake of illustration, the drive pulley 70 is connected to the secondary motive power source 13 which is supported on the back of the support plate 14. Furthermore, the drive pulley 72, which has a larger diameter than that of the drive pulley 70, is connected to the line shaft 3 which extends through the support plate 14 and which, as noted previously, is driven by the primary motive power source 2.

Figure 4:
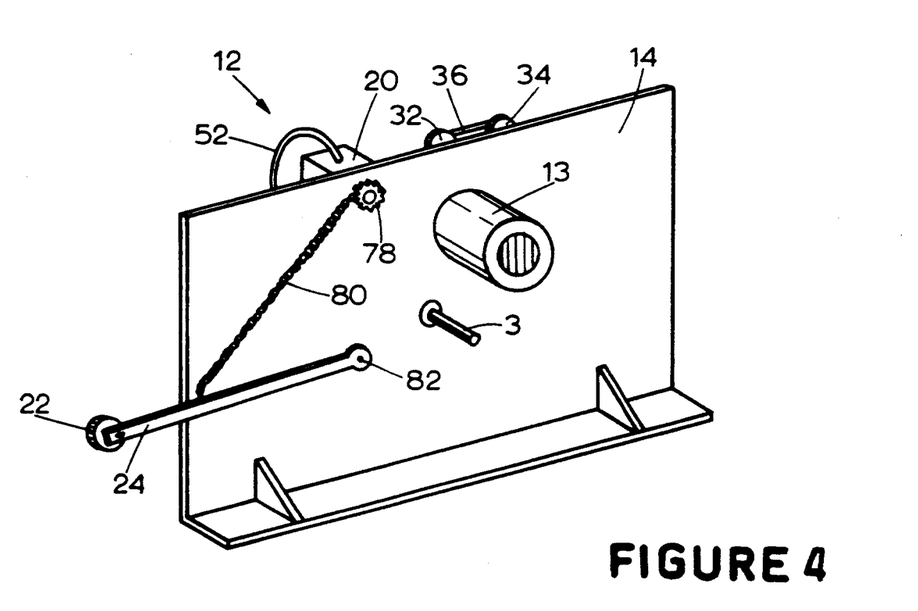
FIG. 4 is a back perspective view of the drive system of FIG. 2.

FIG. 4 illustrates the back of the drive system 12. A sprocket 78 is secured to a rotary shaft of the rotary actuator 20 that extends through the support plate 14. One end of a chain 80 is attached to the sprocket 78 while the other end of the chain 80 is attached to the support bar 24. When the controller 47 delivers pressurized air through the air hose 52, the rotary actuator 20 rotates the sprocket 78 in a clockwise direction, as seen in FIG. 4, to wind the chain 80 thereon. As a result, the support bar 24 rotates about a pivot point 82 to move the take-up pulley 22 in an arcuate path.

Figure 5:
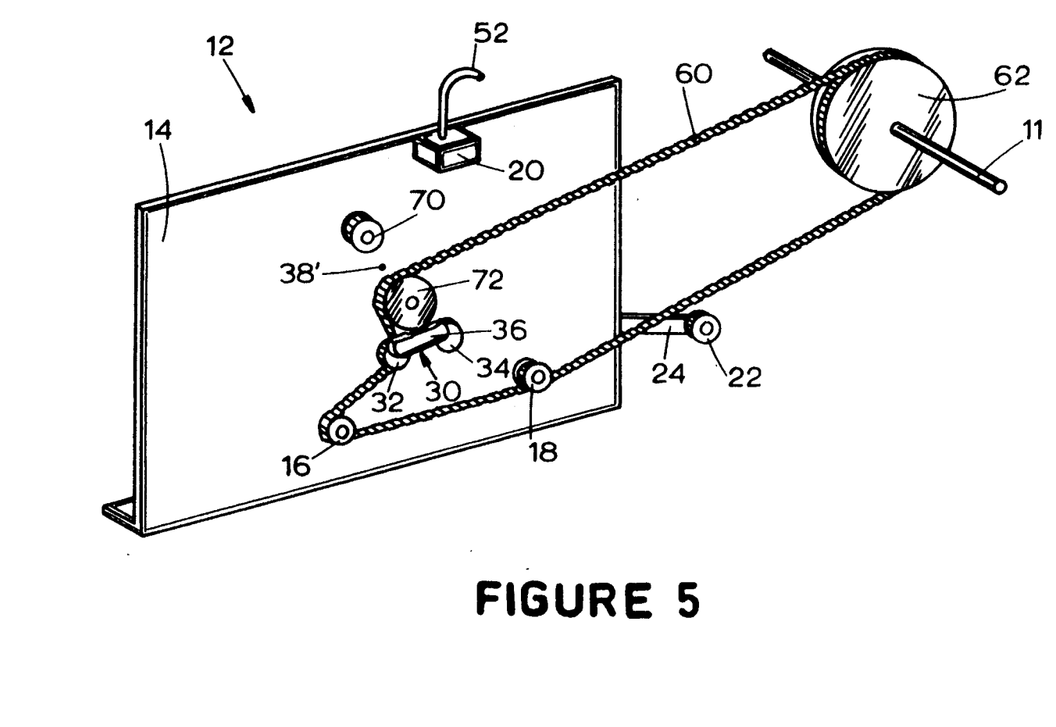
FIG. 5 is a front perspective view similar to FIG. 1 with elements removed to reveal the drive system, configured to connect the drive shaft to a primary motive power source, in greater detail.
Figure 6:
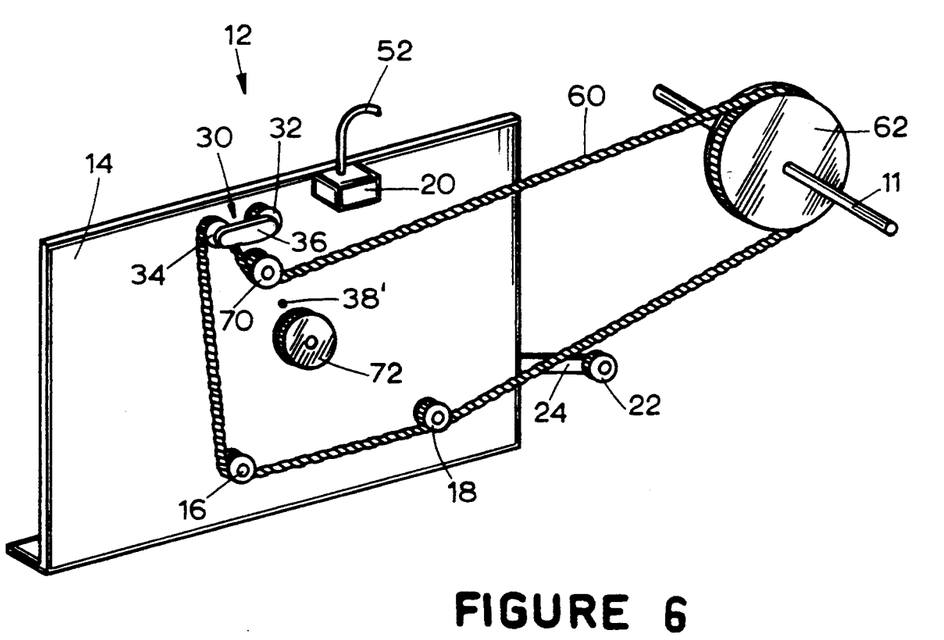
FIG. 6 is a view identical to FIG. 5 wherein the drive system is configured to connect the drive shaft to a secondary motive power source.
Figure 7:
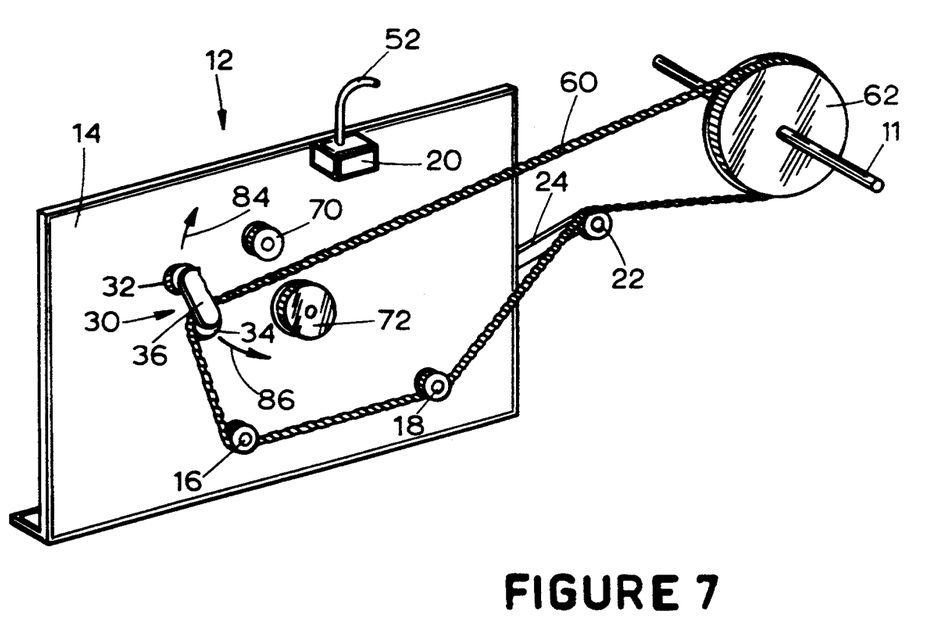
FIG. 7 is a view identical to FIG. 5 wherein the drive system is in transition between the configuration shown in FIG. 5 and the configuration shown in FIG. 6.

The operation of the drive system 12 will be hereinafter described with reference to FIGS. 5–7, which are perspective views of the front of the drive system 12 with the support plate 26, the idler pulley set power mechanism 40 and the controller 47 removed and with the support plate 36 partially cut away for the sake of clarity. As shown in FIGS. 5–7, the drive pulleys 70 and 72 are mounted diagonally adjacent one another on the front of the support plate 14 such that the axis of rotation of the idler pulley set 30, indicated by the point 38', is located therebetween.

In the configuration of FIG. 5, the idler pulley set 30 is located in a first position which is below and in close proximity to the drive pulley 72. The double-sided drive belt 60 engages the drive shaft pulley 62, the idler pulleys 16 and 18, the idler pulley 32 of the idler pulley set 30 and the drive pulley 72. The drive shaft 11 is thus coupled to the line shaft 3 and is operated in synchronization with the gatherer 7, the stitcher 8 and the trimmer 9 (FIG. 1) at a speed determined by the rotational speed of the line shaft 3 and the diameters of the pulleys 62 and 72.

FIG. 6 illustrates the drive system 12 in a second configuration in which the drive pulley 70 rotates the drive shaft 11. In this configuration, the idler pulley set 30 is located in a second position which is above and in close proximity to the drive pulley 70. The double-sided drive belt 60 engages the drive shaft pulley 62 the idler pulleys 16 and 18, the idler pulley 34 of the idler pulley set 30 and the drive pulley 70. In this configuration, the drive shaft 11 is driven by the secondary motive power source 13, which is connected to the drive pulley 70, at a rotational speed determined by the rotational speed of the secondary motive power source 13 and the diameters of the pulleys 62 and 70. The drive shaft 11 is thus operated independently of the drive pulley 72, and hence, is operated independently of the line shaft 3. Preferably the secondary motive power source 13 is a variable speed motor so that the drive shaft 11, and consequently, the mail table 10, can be driven at a plurality of different speeds when coupled to the secondary motive power source 13.

As should be evident from an inspection of the figures, a first side of the double-sided drive belt 60 engages the drive pulley 72 when the drive system 12 is in the first configuration (shown in FIG. 5) while a second side of the double-sided drive belt 60 engages the drive pulley 70 when the drive system 12 is in the second configuration (shown in FIG. 6).

Referring now to FIG. 7, the operation of the drive system 12 during the transition between the first and second configurations will be described. When the controller 47 receives a signal from the operator to reconfigure the drive system 12 from the first configuration to the second configuration, the controller 47 routes pressurized air to the cylinders 42a and 43b, and simultaneously vents pressure from the cylinders 42b and 43a to rotate the idler pulley set 30 about the pivot point 38 in the direction of the arrow 84. Rotation of the idler pulley set 30 causes the double-sided drive belt 60 to disengage from the drive pulley 72 and to move toward the drive pulley 70. Further, the double-sided drive belt 60 disengages from the idler pulley 32 and engages the idler pulley 34. When the idler pulley set 30 reaches the second position (FIG. 6), the double-sided drive belt 60 fully engages the drive pulley 70 and the idler pulley 34. At this time, the controller 47 continues to route pressurized air to the cylinders 42a and 43b to lock the idler pulley set 30 in the second position and apply constant pressure to the double-sided drive belt 60.

Consequently, during rotation of the idler pulley set 30 from the second position to the first position, the controller 47 routes pressurized air to the cylinders 42b and 43a and simultaneously vents pressure from the cylinders 42a and 43b. The idler pulley set 30 then rotates in the direction of the arrow 86 which causes the double-side drive belt 60 to disengage from the drive pulley 70 and the idler pulley 34 and to engage the drive pulley 72 and the idler pulley 32. When the idler pulley set 30 reaches the first position, the controller 47 continues to route pressurized air to the cylinders 42b and 43a to lock the idler pulley set 30 in the first position.

Furthermore, when the idler pulley set 30 rotates in either direction about the pivot point 38, the controller 47 routes pressurized air via the air hose 52 to the rotary actuator 20 which applies rotational pressure to the sprocket 78. The sprocket 78 responds to the rotary actuator 20 by rotating in a clockwise direction (as seen in FIG. 4) which winds the chain 80 onto the sprocket 78. As a result, the support bar 24 rotates about the pivot point 82 which, in turn, causes the take-up pulley 22 to move upward in an arcuate path. As the take-up pulley moves upward, it engages the double-sided drive belt 60 to take up the slack formed therein by the rotation of the idler pulley set 30 about the pivot point 38.

As the idler pulley set 30 nears either the first or second position, the idler pulley set 30 exerts a force on the double-sided drive belt 60 opposing the force applied by the sprocket 78 and the rotary actuator 20. The take-up pulley 22 is thus rotated downwardly but continues to keep the double-sided drive belt 60 taut. When the idler pulley set 30 reaches either the first or second position, which may be indicated by the tripping of one or more switches (not shown) located at the first and/or second positions or by any other desired device which detects the position of the idler pulley set 30, the controller 47 removes pressure from the rotary actuator 20 which, in turn, removes pressure from the take-up pulley 22. The take-up pulley 22 then disengages from the double-sided drive belt 60 and returns to the inactive position (shown in FIGS. 1–6).

Preferably, when the idler pulley set 30 is rotating between the first and second positions, the primary motive power source 2 and the secondary motive power source 13 are disabled to prevent damage to the components of the drive system 12 and to assure the safety of persons near the drive system 12.

Although control of the take-up pulley 22 has been described as being accomplished by the rotary actuator 20, and rotation of the idler pulley set 30 has been described as accomplished by the drive mechanism 40, any other suitable drive mechanisms, including electrically powered drive mechanisms, may be used instead. Furthermore, the toothed pulleys and the toothed belt described above may be replaced with V-pulleys and a V-belt or with sprockets and a chain, respectively.

Still further, although the drive system 12 has been described as including drive pulleys 70 and 72 having different diameters and being attached to different drive motors, the drive pulleys 70 and 72 may, instead, have different diameters and be driven by the same drive motor. This configuration enables the mail table 10 to be selectively operated at different speeds from a single motive power source. Alternatively, the drive pulleys 70 and 72 may have the same diameter and be driven at either the same or different speeds by different drive motors.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A drive system which is connected to a motive power source and which is capable of rotating a drive shaft at one of a plurality of speeds, comprising:
   a first drive pulley capable of rotating the drive shaft at a first speed;
   a second drive pulley capable of rotating the drive shaft at a second speed;
   a double-sided drive belt selectively engagable with one of the first and second drive pulleys and further engaged with the drive shaft wherein the double-sided drive belt rotates the drive shaft in response to the rotation of the one of the first and second drive pulleys; and
   means coupled to the double-sided drive belt for transferring the double-sided drive belt from one of the first and second drive pulleys to the other of the first and second drive pulleys.

2. The drive system of claim 1, wherein the transferring means comprises a pulley set which includes first and second idler pulleys and which is rotatable about a pivot point from a first position to a second position and wherein the double-sided drive belt engages the first idler pulley when the pulley set is in the first position and engages the second idler pulley when the pulley set is in the second position.

3. The drive system of claim 2, wherein the double-sided drive belt includes a first side which engages the first drive pulley when the pulley set is in the first position and a second side which engages the second drive pulley when the pulley set is in the second position.

4. The drive system of claim 1, further including a take-up pulley which engages the double-sided drive belt when the transferring means transfers the double-sided drive belt from one of the first and second drive pulleys to the other of the first and second drive pulleys so as to take up slack in the double-sided drive belt.

5. The drive system of claim 4, wherein the transferring means comprises a pulley set which includes first and second idler pulleys and which is rotatable about a pivot point from a first position to a second position and wherein the double-sided drive belt engages the first idler pulley when the pulley set is in the first position and engages the second idler pulley when the pulley set is in the second position.

6. The drive system of claim 5, further including means for moving the pulley set in an arcuate path, means for actuating the take-up pulley and a controller which operates the moving means and the actuating means.

7. The drive system of claim 6, wherein the moving means includes a first air-driven cylinder which engages the pulley set to move the pulley set in a first direction and a second air-driven cylinder which engages the pulley set to move the pulley set in a second direction opposite the first direction and wherein the actuating means includes a rotary actuator.

8. The drive system of claim 1, wherein the first drive pulley has a first diameter and the second drive pulley has a second diameter different then the first diameter.

9. The drive system of claim 1, wherein the first drive pulley is connected to the motive power source and wherein the second drive pulley is connected to a further motive power source.

10. The drive system of claim 1, wherein the first and second drive pulleys and the double-sided drive belt include teeth.

11. A drive system which connects a drive shaft to one of first and second motive power sources, comprising:
   a first drive pulley coupled to the first motive power source;
   a second drive pulley coupled to the second motive power source;
   a double-sided drive belt selectively engagable with one of the first and second drive pulleys and further engaged with the drive shaft wherein the double-sided drive belt rotates the drive shaft in response to the rotation of the one of the first and second drive pulleys; and
   means coupled to the double-sided drive belt for transferring the double-sided drive belt from one of the first and second drive pulleys to the other of the first and second drive pulleys.

12. The drive system of claim 11, wherein the transferring means comprises a pulley set which includes first and second idler pulleys and which is rotatable about a pivot point from a first position to a second position and wherein the double-sided drive belt engages the first idler pulley when the pulley set is in the first position and engages the second idler pulley when the pulley set is in the second position.

13. The drive system of claim 12, wherein the double-sided drive belt includes a first side which engages the first drive pulley when the pulley set is in the first position and a second side which engages the second drive pulley when the pulley set is in the second position.

14. The drive system of claim 12, further including a take-up pulley which engages the double-sided drive belt when the transferring means transfers the double-sided drive belt from one of the first and second drive pulleys to the other of the first and second drive pulleys so as to take up slack in the double-sided drive belt.

15. The drive system of claim 14, further including means for moving the pulley set, means for actuating the take-up pulley and a controller which operates the moving means and the actuating means.

16. The drive system of claim 15, wherein the moving means includes a first air-driven cylinder which engages the pulley set to move the pulley set in a first direction and a second air-driven cylinder which engages the pulley set to move the pulley set in a second direction opposite the first direction and wherein the actuating means includes a rotary actuator.

17. The drive system of claim 16, wherein the first drive pulley has a first diameter and the second drive pulley has a second diameter, different then the first diameter.

18. The drive system of claim 11, wherein the first and second drive pulleys and the double-sided drive belt include teeth.

19. A drive system which rotates a drive shaft of a component of a binding line, wherein the binding line includes a primary motive power source which drives a line shaft and a secondary motive power source, comprising;
    a first drive pulley connected to the line shaft;
    a second drive pulley connected to the secondary motive power source;
    a double-sided drive belt selectively engagable with one of the first and second drive pulleys and further engaged with the drive shaft wherein the double-sided drive belt rotates the drive shaft in response to the rotation of the one of the first and second drive pulleys; and
    a pulley set moveable in an arcuate path about a pivot point between a first position and a second position wherein a first pulley of the pulley set engages the double-sided drive belt when the pulley set is in the first position and a second pulley of the pulley set engages the double-sided drive belt when the pulley set is in the second position.

20. The drive system of claim 19, further including a take-up pulley which engages the double-sided drive belt when the pulley set rotates from one of the first and second positions to the other of the first and second positions so as to take up slack in the double-sided drive belt.

21. The drive system of claim 20, wherein the double-sided drive belt includes a first side which engages the first drive pulley when the pulley set is in the first position and a second side which engages the second drive pulley when the pulley set is in the second position.

22. The drive system of claim 20, further including a first air-driven cylinder which engages the pulley set to move the pulley set in a first direction and a second air-driven cylinder which engages the pulley set to move the pulley set in a second direction opposite the first direction and a rotary actuator which actuates the take-up pulley.

23. The drive system of claim 22, wherein the first drive pulley has a first diameter and the second drive pulley has a second diameter, different than the first diameter.

24. The drive system of claim 19, wherein the first and second drive pulleys and the double-sided drive belt include teeth.

25. A method of providing motive power produced by first and second motive power sources to a drive shaft, the method comprising the steps of:
    providing a movable idler pulley set, a doublesided drive belt coupled to the idler pulley set and to the drive shaft and first and second drive pulleys coupled to the first and second motive power sources, respectively;
    selectively moving the idler pulley set to a first position to engage the double-sided drive belt with the first drive pulley thereby to couple the first motive power source to the drive shaft; and
    selectively moving the idler pulley set to a second position to engage the double-sided drive belt with the second drive pulley thereby to couple the second motive power source to the drive shaft.

26. The method of claim 25, further including the step of operating a take-up pulley to engage the double-sided drive belt and thereby take up slack in the double-sided drive belt during the steps of moving the idler pulley set.

27. The method of claim 25, wherein the steps of moving includes the step of rotating the idler pulley set about a pivot point between the first and second positions.

28. The method of claim 27, wherein the step of rotating the idler pulley set includes the step of removing the double-sided drive belt from one of a first and second pulley of the idler pulley set and engaging the double-sided drive belt with the other of the first and second pulley of the idler pulley set.

29. The method of claim 28, wherein the step of moving the idler pulley set to the first position includes the step of engaging a first side of the double-sided drive belt with the first drive pulley and wherein the step of moving the idler pulley set to the second position includes the step of engaging a second side of the double-sided drive belt with the second drive pulley.

30. The method of claim 29, wherein the step of moving the idler pulley set to the first position includes the step of driving a first air-driven cylinder to move the idler pulley set in a first direction and wherein the step of moving the idler pulley set to the second position includes the step of driving a second air-driven cylinder to move the idler pulley set in a second direction opposite the first direction.

* * * * *